United States Patent [19]
Kolb

[11] Patent Number: 6,129,110
[45] Date of Patent: Oct. 10, 2000

[54] FLUID LEVEL MANAGEMENT SYSTEM

[75] Inventor: Kemp Bennett Kolb, Doylestown, Pa.

[73] Assignee: Milton Roy Company, Ivyland, Pa.

[21] Appl. No.: 08/634,012

[22] Filed: Apr. 17, 1996

[51] Int. Cl.[7] ........................ F16K 31/02; F16K 31/22; F16K 33/00
[52] U.S. Cl. .................. 137/391; 137/423; 137/433; 137/565.16; 417/36; 417/40
[58] Field of Search .................. 137/423, 429, 137/430, 433, 391, 565.01, 565.16; 417/36, 40, 44.1

[56] References Cited

U.S. PATENT DOCUMENTS

| | | | |
|---|---|---|---|
| 495,377 | 4/1893 | Searle | 137/196 |
| 950,533 | 3/1910 | Hilliard | 137/429 |
| 1,882,196 | 10/1932 | Siems | 73/313 |
| 2,383,507 | 8/1945 | Martin | 137/429 |
| 2,592,908 | 4/1952 | Katz | 137/104 |
| 2,694,171 | 11/1954 | Campbell | 318/482 |
| 2,832,370 | 4/1958 | Hill | 137/433 |
| 2,920,644 | 1/1960 | Schulze et al. | 137/391 |
| 3,464,437 | 9/1969 | Zane | 137/429 |
| 3,989,043 | 11/1976 | Dimeff | 604/254 |
| 4,080,985 | 3/1978 | Eagle | 137/429 |
| 4,301,824 | 11/1981 | Payne | 137/423 |
| 4,380,243 | 4/1983 | Braley | 137/429 |
| 4,865,073 | 9/1989 | Kocher | 137/429 |
| 4,877,049 | 10/1989 | Fornasari | 137/429 |
| 5,018,550 | 5/1991 | Burdoff | 137/429 |
| 5,309,939 | 5/1994 | Stickel et al. | 137/429 |

Primary Examiner—George L. Walton

[57] ABSTRACT

A fluid level management system for controlling a fluid level contained within a reservoir housing is described. The fluid level management system utilizes two separate predetermined fluid levels, a first and a second spaced below the first, to create a fluid level differential though which a control apparatus actuates a single activation switch. Use of the fluid level management system in conjunction with a pump for removing the fluid contained within the housing is further described. The pump is responsive to the control apparatus actuating and deactuating the switch depending on the fluid being at the first or second predetermined fluid level, respectively.

15 Claims, 8 Drawing Sheets

FLUID LEVEL MANAGEMENT SYSTEM

TECHNICAL FIELD

This invention relates to reservoir pumps, and more particularly, to fluid level management systems for controlling fluid level within such reservoirs by actuation of a single activation switch.

BACKGROUND

Reservoir pumps, as designed and manufactured by industrial pump suppliers, find commercial use in many household applications. For example, air conditioning units typically produce excess condensation as air is cooled and humidified for delivery to a desired location. This excess condensation is removed by a condensate pump working in conjunction with the air conditioning unit. Other consumer products employing reservoir pumps, often found in the household, include ice machines and humidifiers. Each of these appliances produce waste water which needs to be removed from the respective system in order to function properly.

Such appliances which utilize reservoir pumps can be located near drains, often found in household basements. However, since many building structures do not include such drains or the drains are not adequately located near the appliance in operation, proper removal of the waste fluid produced becomes an important factor during usage. This is especially true in situations where no drain is available and the operating environment calls for a sealed reservoir pump. Without proper removal of the waste fluid, regardless of whether the reservoir housing is sealed or not, extensive flooding can occur if the waste fluid is produced by the appliance faster than it is removed from the reservoir by a pump. Such flooding can lead to significant property damage, both in terms of structural damage (i.e. foundational decay and mildew) and also personal belongings (i.e. storage or furnished rooms). Notwithstanding the property damage from flooding, the appliance can also malfunction requiring repair to the damaged parts, if not complete replacement of the reservoir unit, which adds cost to the consumer.

One method previously used to trigger the pumping mechanism to remove the waste fluid, and thus control the waste fluid level in the reservoir, involves utilizing a two-position toggle switch. Such a toggle switch, as it is named, requires an initial activation to turn the switch on, and an additional activation to turn the switch off. Thus, to perform the desired operation within a reservoir unit, at least two separate mechanical movements need to occur for the toggle switch to properly function; for example, at least one action of the switch is needed to trigger the pump to start removal of the waste fluid and at least a second action of the switch (i.e. via a pivot, cam or lever) is needed to subsequently stop the pumping action, once enough of the waste fluid has been removed from the reservoir. With each of these separate steps and the associated mechanics to accomplish these actions, additional piece parts can be required in the assembly and operation of reservoir units. Since the appliances are typically sold in consumer markets, any design complication can negatively impact both the reliability and cost associated with a particular pump.

One switch mechanism which avoids the problems associated with separate movements and extraneous pivots and levers is referred to by the industry as a single activation or spring-loaded switch. As its name implies, only one movement can be necessary to create a sufficient contact pressure on the switch in order to activate it. Once that contact pressure is released, the switch automatically turns off. Thus, no separate operating positions or distinct levers are required to actuate such a switch. Additionally, single activation switches cost less than more elaborately designed toggling switches, which can add up to significant cost savings for the consumer.

However, while the use of single activation switches is advantageous when feasible, reservoir pumps create a unique environment in which to incorporate such a switch. Typically, the removal of waste fluid from the reservoir housing by the pump is triggered by activation of a switch. However, by virtue of the facilitated manner in which a single activation switch operates, as soon as contact pressure is released from the switch, it can deactivate which will subsequently turn off the pump which is removing the waste fluid. Thus, unless actuation of the switch is maintained through adequate contact pressure, the reservoir pump will continuously switch on and off prior to any waste fluid being removed from the reservoir. This constant switching on/off does not allow reliable control and management of the fluid level within the reservoir. Again, without adequate control and removal of the waste fluid, the appliance can malfunction leading to damage of both the unit and flooding of nearby property.

It is, therefore, a primary object of the present invention to provide an improved fluid level management system for use in reservoir pumps. Other objects of the invention include providing the following:

(i) an efficient design for a fluid level management system which maximizes reliability, while minimizing production and consumer cost;

(ii) a fluid level management system as above, which eases manufacturing and assembly due to its efficient and straightforward design;

(iii) a fluid level management system which reliably controls fluid level within a reservoir housing;

(iv) a fluid level management system which provides an adequate fluid level differential to be established within a reservoir housing for proper actuation of a switch;

(v) a straightforward reservoir pump design which properly functions upon actuation and deactuation of a single activation switch; and (vi) an improved reservoir pump design which is particularly suited for sealed environments.

SUMMARY OF THE INVENTION

The present invention provides a fluid level management system for controlling a fluid level contained within a reservoir housing. The fluid level management system utilizes two separate predetermined fluid levels, a first and a second spaced below the first, to create a fluid level differential through which a control apparatus can actuate a single activation switch. Additionally, the invention provides a pumping mechanism for removing the fluid contained within the housing, which is responsive to the control apparatus actuating and deactuating the switch depending on the fluid being at the first or second predetermined fluid level, respectively.

The present invention provides such a fluid level management system to include a first float valve apparatus which is in fluid communication with the housing. The first float valve apparatus actuates the single activation switch upon the fluid reaching the first predetermined level. Preferably, the first float valve apparatus includes a first chamber having an aperture. This aperture defines the first predetermined fluid level and provides fluid communication between the housing and the first chamber. Additionally, the first float valve apparatus includes a first buoyant member which is movable within the first chamber as the fluid rises to the first predetermined level. The first buoyant member then actuates the switch upon the fluid within the first chamber reaching the first predetermined level defined by the aperture.

The present invention further provides the fluid level management system to include a second float valve apparatus operating in conjunction with the second predetermined fluid level and the first float valve apparatus. The second float valve apparatus includes a second chamber which has both an aperture and an orifice. This aperture defines the second predetermined fluid level and provides fluid communication between the housing and the second chamber. The orifice of the second chamber provides an opening to the first chamber and is adapted to allow fluid communication between the second chamber and the first chamber, when it is desirable for fluid to flow from the first chamber into the second chamber. The second float valve apparatus further includes a second buoyant member which is movable within the second chamber as the reservoir housing receives fluid. Upon movement, the second buoyant member seals the orifice and prevents fluid communication between the first and second chambers until the fluid within the housing recedes to the second predetermined level. Once the fluid within the housing recedes to the second predetermined level, the second buoyant member unseals the orifice and allows the fluid within the first chamber to recede from the first predetermined level and flow into the second chamber. As the first buoyant member moves in relation with the fluid in the first chamber, the switch is deactuated.

According to one aspect of the present invention, both the first and second buoyant members are substantially spherical in shape and each is freely movable within the first and second chambers, respectively.

According to another aspect of the present invention, the fluid level management system includes a movable member which is disposed between the first float valve apparatus and the switch to create a sealed reservoir environment. The movable member is responsive to movement of the first buoyant member such that as the fluid in the first chamber reaches the first predetermined level, the switch is actuated. The movable member is further responsive to movement of the first buoyant member such that as the fluid within the housing recedes to the second predetermined level and the second buoyant member unseals the orifice and the first buoyant member recedes with the fluid in the first chamber flowing into the second chamber, the switch is deactuated. This actuation and delayed deactuation of the switch by the present fluid level management system allows for an adequate fluid level differential to be created for control of fluid within a reservoir housing.

Other objects, aspects and advantages of the invention will become readily apparent upon consideration of the following drawings and detailed descriptions of preferred embodiments.

DESCRIPTION OF THE PREFERRED EMBODIMENTS

Figure 1:
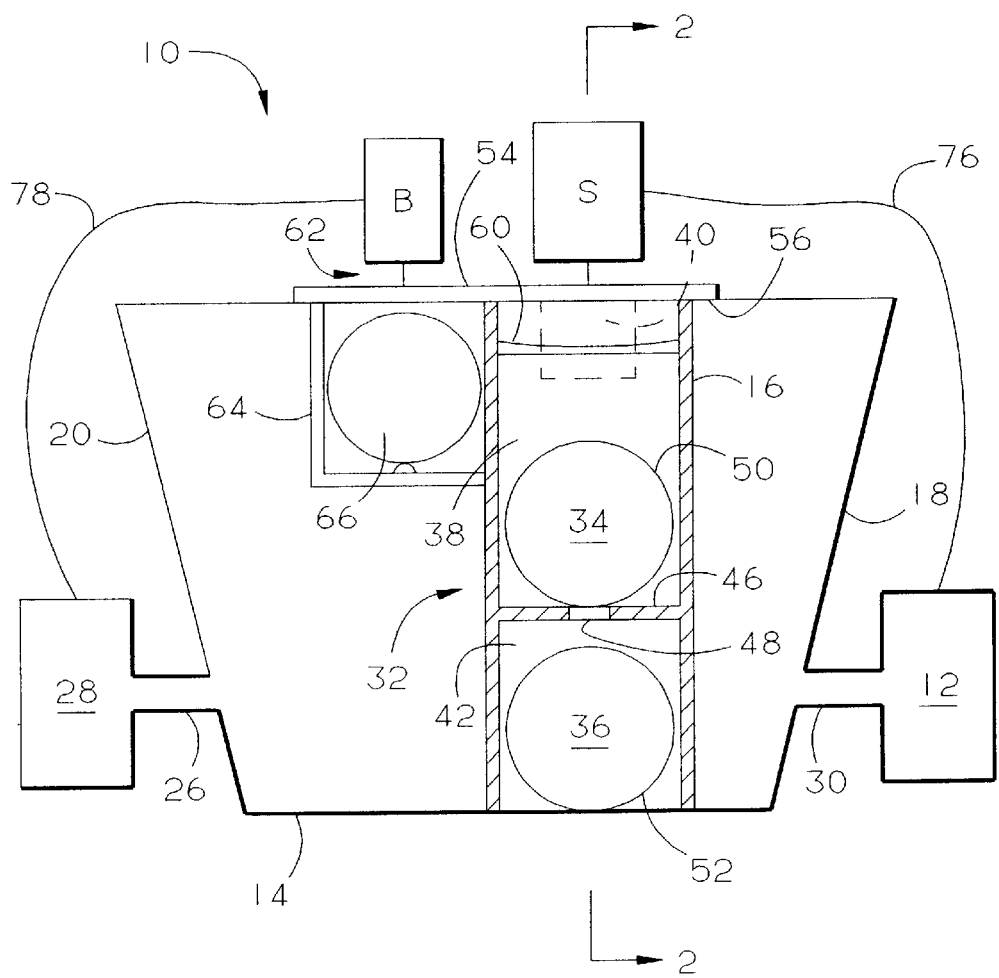
FIG. 1 is a partial sectional and diagrammatic view of a fluid level management system according to the present invention.

FIG. 1 illustrates an exemplary embodiment of a fluid level management system 10 which can be utilized in conjunction with a pump, schematically shown at 12. The pump 12 may be of a synchronous motor type with a clutching mechanism which allows synchronous speed to be achieved with minimal pumping torque.

Figure 2:
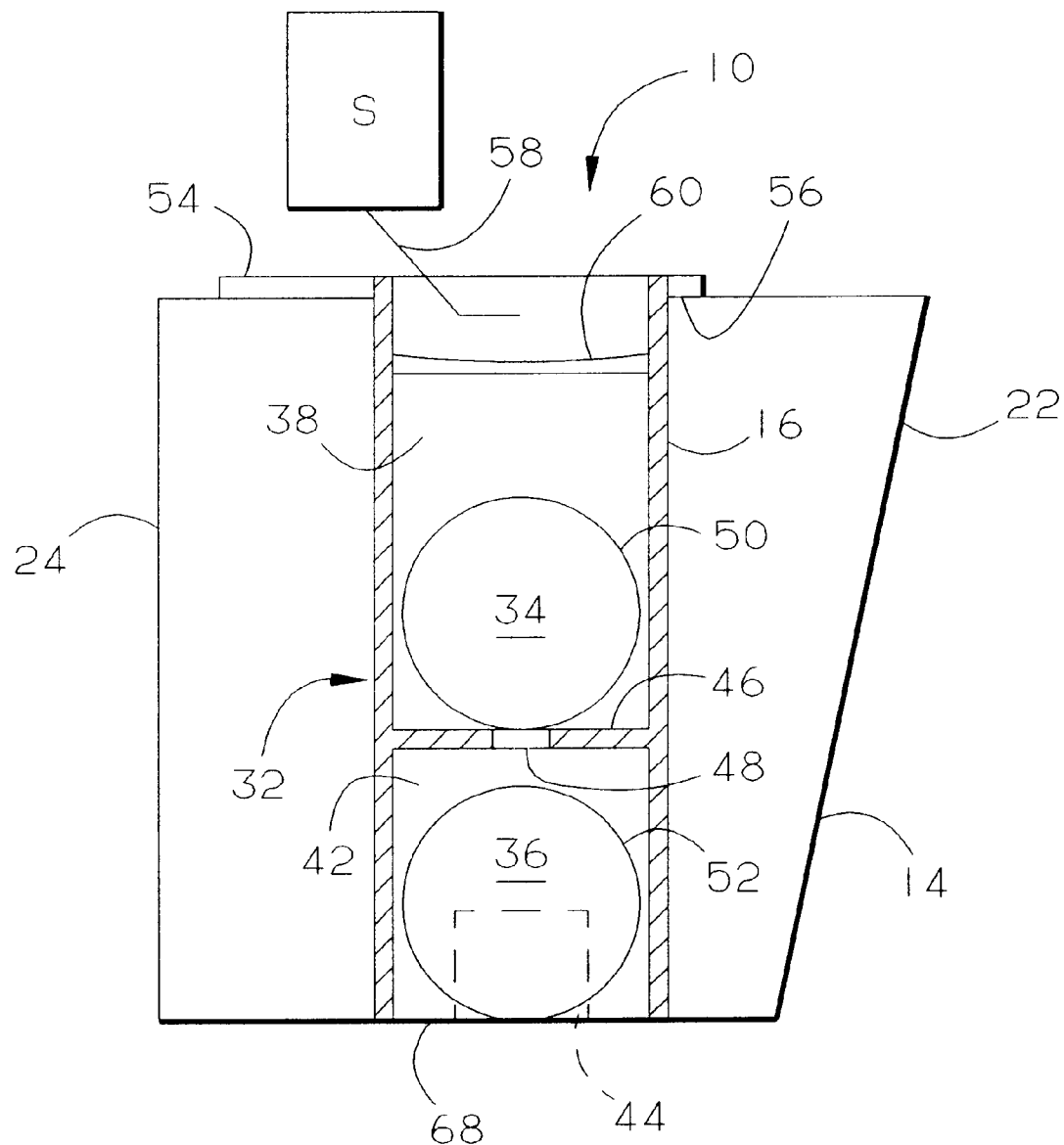
FIG. 2 is a partial sectional and diagrammatic view of the fluid level management system at rest taken along line 2—2 as indicated in FIG. 1.

The fluid level management system 10 includes a reservoir housing 14 which is defined by outer walls 18 and 20 (FIG. 1) and outer walls 22 and 24 (FIG. 2). The housing includes an inlet 26 for receiving fluid from an appliance, schematically shown at 28, which produces waste fluid such as excess condensation or other liquid byproduct during operation. Illustrative examples of such an appliance 28 include air conditioning units, ice machines and humidifiers; however, one skilled in the art can appreciate the applicability of the present invention to other appliances requiring a reservoir for collecting fluid. The reservoir housing 14 further includes an outlet 30 which is connected to the pump 12. As will be described further, the present invention provides the fluid level management system 10 to control the amount of fluid received in the reservoir housing 14 through inlet 26 and exiting outlet 30 via the operation of the pump 12.

The fluid level management system 10 further includes a control means or control apparatus, generally designated 32 on FIGS. 1 and 2. The control apparatus 32 is disposed within the reservoir housing 14 and defined by enclosure 16. Preferably, the enclosure 16 is cylindrical in nature; however, the present invention contemplates any suitable shape for the enclosure 16 in which the individual elements of the control apparatus 32 can operate. The enclosure 16 can be molded as an integral piece from a suitable lightweight plastic material which is chemically compatible with the fluid received by the reservoir housing 14. The present invention contemplates the use of acrylonitrilebutadienestyrene (ABS).

Figure 1A:
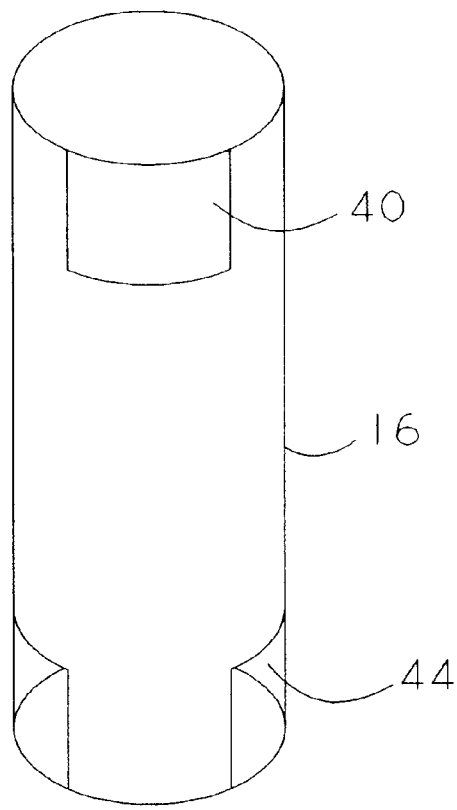
FIG. 1a is a perspective illustration of the front of enclosure 16 according to the present invention.
Figure 1B:
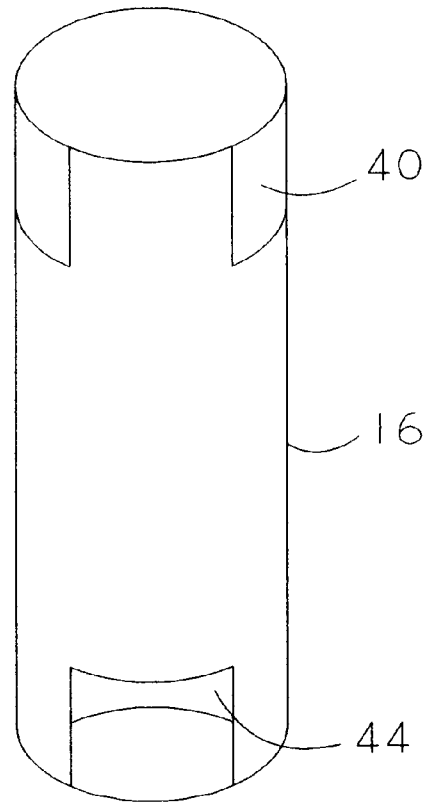
FIG. 1b is a perspective illustration of the side of enclosure 16 according to the present invention.

As shown in FIGS. 1 and 2, the control apparatus 32 includes a first float valve means 34 and a second float valve means 36 for which an outer wall is defined by the cylinder of the enclosure 16. The first float valve means 34 within the enclosure 16 includes a first chamber 38 which has an aperture 40 (shown hidden in FIG. 1) located at an upper end of the first chamber 38. The second float valve means 36 within the enclosure 16 includes a second chamber 42 which also has an aperture 44 (shown hidden in FIG. 2) at a bottom end of the second chamber 42. FIGS. 1a and 1b illustrate the enclosure 16 with the aperture 40 and the aperture 44 in both a perspective front and side view, respectively.

As depicted in the cross-sectional views of FIG. 1 and 2, a plate 46 is disposed within the enclosure 16 to define a common wall between the first chamber 38 and the second chamber 42. Thus, the plate 46 defines both an upper end for the first chamber 38 and a lower surface for the second chamber 42. The plate 46 includes an orifice 48 which provides an opening between the second chamber 42 and the first chamber 38 and is adapted to allow fluid communication between the first chamber 38 and the second chamber 42, when left unsealed. With the geometry of the plate 46 separating the first chamber 38 from the second chamber 42, one can appreciate the aperture 40 provides an opening for fluid communication between the reservoir housing 14 and the first chamber 38. Similarly, the aperture 44 provides an opening for fluid communication between the reservoir housing 14 and the second chamber 42.

Disposed within the first chamber 38 of the first float valve means 34 is a first buoyant member 50 which is freely movable within the first chamber 38 as fluid enters the first chamber 38 via the aperture 40. Similarly, the second float valve means 36 includes a second buoyant member 52 which is disposed within the second chamber 42 and freely movable therein, as fluid enters the second chamber 42 through the aperture 44. Preferably, both the first and second buoyant members 50 and 52 constitute hollow spherical balls which are constructed from a polyethylene material or other lightweight plastic. However, the present invention contemplates any suitable material which provides adequate floatation properties for the fluid being received in the reservoir housing 14.

A primary switch S, shown schematically, is located on a cover plate 54 adjacent a top surface 56 of the reservoir housing 14. The cover plate 54 can be constructed from a similar ABS material as the enclosure 16 and can additionally be molded therewith. As shown in FIG. 2, the primary switch S is preferably of a single activation type with a movable blade 58 which can actuate when sufficient contact pressure is applied to it. Upon actuation, the blade 58 provides electrical connection for the primary switch S to subsequently turn on a device to which the primary switch S is connected. In a preferred embodiment of the present invention, the primary switch S is electrically coupled to the pump 12 via wire 76 such that as the blade 58 actuates the primary switch S, the pump 12 turns on and begins to remove fluid from the reservoir housing 14 via the outlet 30. The primary switch S continues to provide electrical connection with the pump 12 until the blade 58 is deactuated and the electrical connection along the wire 76 is broken. While the instant invention contemplates using a single activation or spring loaded switch such as those referred to by the industry as miniature switches which are manufactured by either C&K Components, Inc. (TF Series) or Cherry Corporation (E Series) or the Micro Switch Division of Honeywell Inc. (V7 Series) or Crouzet Inc. (83 Series), any switch which actuates upon sufficient contact pressure being applied to it and subsequently holds an electrical connection until the contract pressure is released may be suitable for applications of the present invention.

FIG. 2 further illustrates a movable member 60, such as a diaphragm, which is disposed near the upper end of the first chamber 38 at a location slightly higher than the bottom edge of the aperture 40 (FIG. 1). The movable member 60 is preferably constructed from an elastomeric material to operate between the first float valve means 34 and the blade 58 of the primary switch S. The movable member 60 is responsive to movement of the first buoyant member 50 within the first chamber 38, as the first buoyant member 50 moves in relation to the rising and receding of fluid within the first chamber 38. The movable member 60 further functions to seal the reservoir housing 14 near the top surface 56 of the reservoir housing 14. This can be advantageous in an operating environment when it is desirable to use a sealed reservoir pump (i.e., when sufficient drainage is not available).

As shown in FIG. 1, the fluid level management system 10 can further include a backup switch assembly 62 which is electrically connected via wire 78 to the appliance 28 producing the waste fluid. As illustrated schematically, the backup switch assembly 62 includes a backup switch B which is preferably a single activation switch similar to that of the primary switch S. The backup switch B can be mounted to the cover plate 54 of the reservoir housing 14 in a similar manner to the primary switch S. The backup switch assembly 62 further includes a casing 64 which is located adjacent to the enclosure 16. The casing 64 contains a shutoff ball member 66 which is similar in nature to the first and second buoyant members 50 and 52. During operation of the fluid level management system 10, the shutoff ball member 66 will actuate the backup switch B when the fluid level within the reservoir housing 14 rises too high, as in the case of pump failure. When the backup switch B is actuated, an electrical connection between the backup switch assembly 62 and the appliance 28 is made through wire 78. This electrical connection shuts down the operation of the appliance 28, thus preventing additional fluid from entering the reservoir housing 14 through the inlet 26.

As described in detail above, FIG. 2 illustrates the fluid level management system 10 at rest; thus, the second buoyant member 52 is situated near a bottom surface 70 of the reservoir housing 14 within the second chamber 42, while the first buoyant member 50 is similarly at rest on the plate 46 within the first chamber 38. A retainer pin 68 can be provided on the bottom surface 70 of the reservoir housing 14 to prevent the second buoyant member 52 from sticking to the bottom surface 70 when the fluid level management system 10 is at rest.

Figure 3:
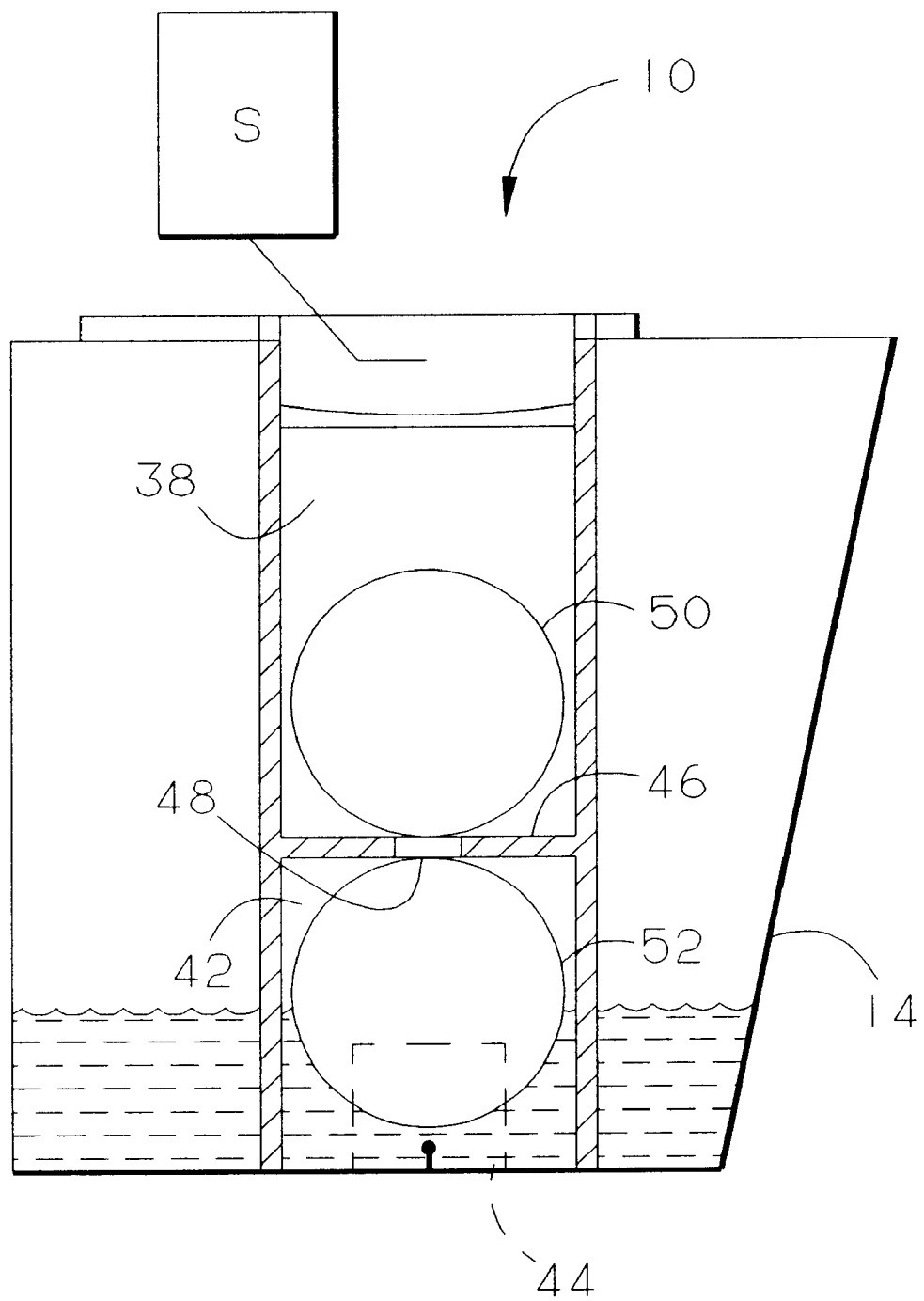
FIGS. 3–7 are partial sectional and diagrammatic views of the fluid level management system shown in FIG. 2 throughout various embodiments of the present invention.

Referring to FIGS. 3 through 7, the operation of the fluid level management system 10 will be described. As shown in FIG. 3, fluid is received by the reservoir housing 14 through the inlet 26 (FIG. 1) and begins to fill the reservoir housing 14. As the aperture 44 of the second chamber 42 provides fluid communication between the reservoir housing 14 and the second chamber 42, the second chamber 42 begins to fill with fluid. As the fluid level in the second chamber 42 rises, the second buoyant member 52 also rises until the second buoyant member 52 meets the plate 46 and seals the orifice 48. Once the orifice 48 has been sealed by the second buoyant member 52, fluid communication is prevented between the second chamber 42 and the first chamber 38. Thus, the first buoyant member 50 remains in a resting position on the plate 46.

Figure 4:
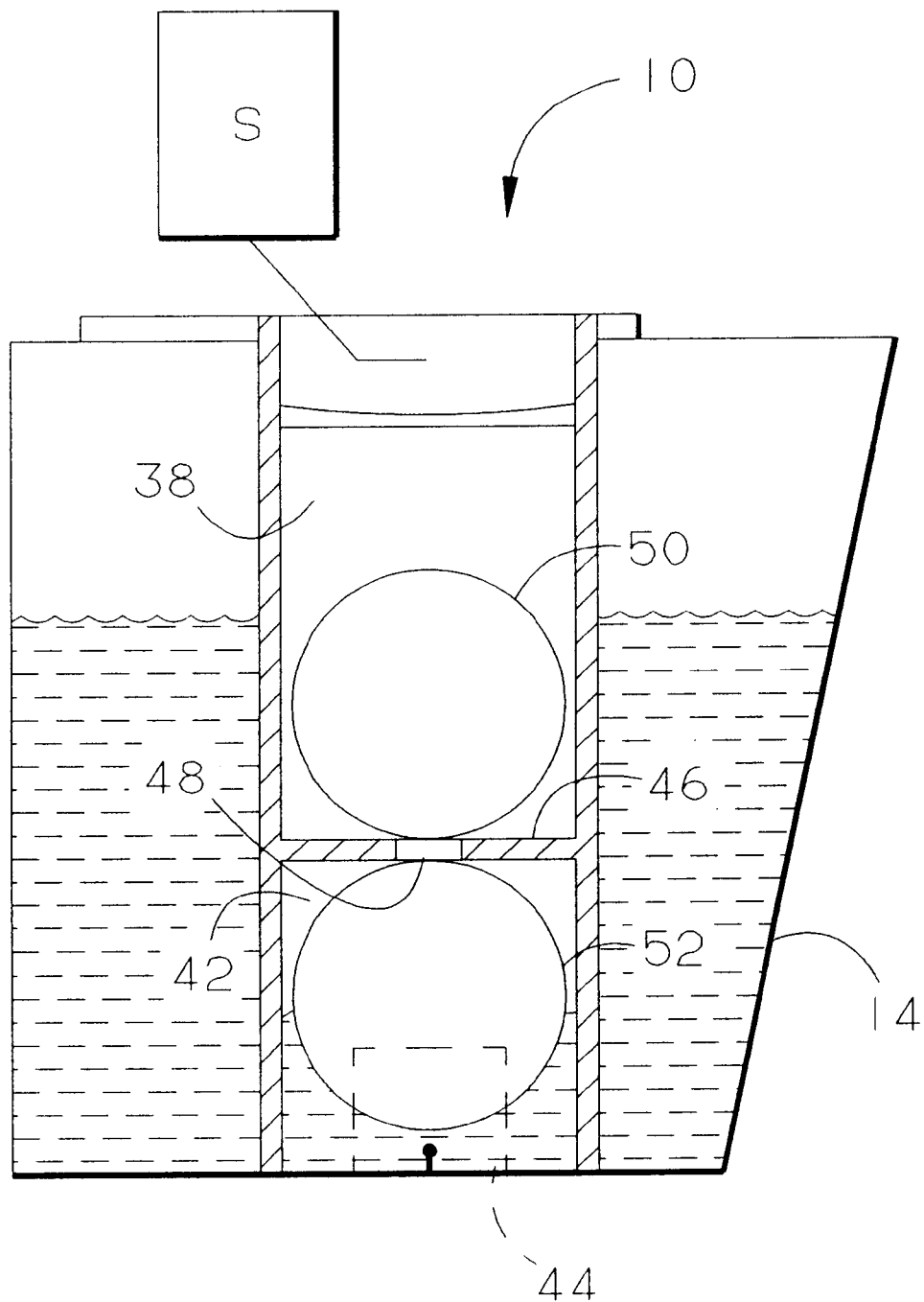

Referring to FIG. 4, the reservoir housing 14 continues to receive fluid through the inlet 26 (FIG. 1) and the fluid level continues to rise. The first buoyant member 50 remains in a resting position on the plate 46 since fluid has only entered the reservoir housing 14 and the second chamber 42 through the aperture 44.

Figure 5:
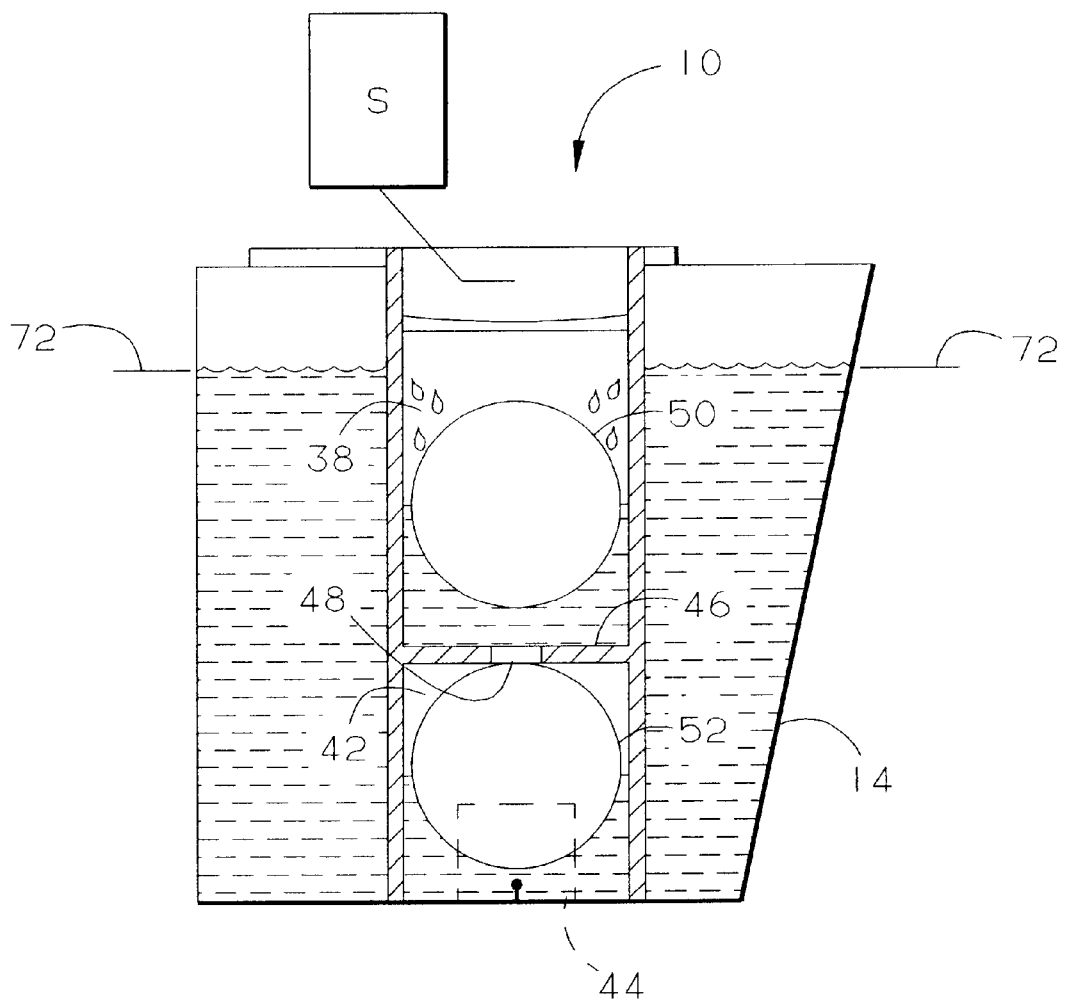

Referring to FIG. 5, fluid, as it continues to fill the reservoir housing 14, will reach the bottom edge of the aperture 40 (FIGS. 1 and 1a). This defines a first predetermined fluid level, shown illustratively by line 72. The first predetermined level 72 can be tailored in the design of the control apparatus 32 (FIG. 1) to accommodate a desired fluid level at which the reservoir housing 14 becomes "full", based on the size of the aperture 40 and the height at which the bottom edge opens to the reservoir housing 14. As the fluid within the reservoir housing 14 reaches the first predetermined level 72, fluid spills over the bottom edge of the aperture 40 and begins to fill the first chamber 38. As the fluid level in the first chamber 38 begins to rise toward the first predetermined level 72, the first buoyant member 50 also rises.

Figure 6:
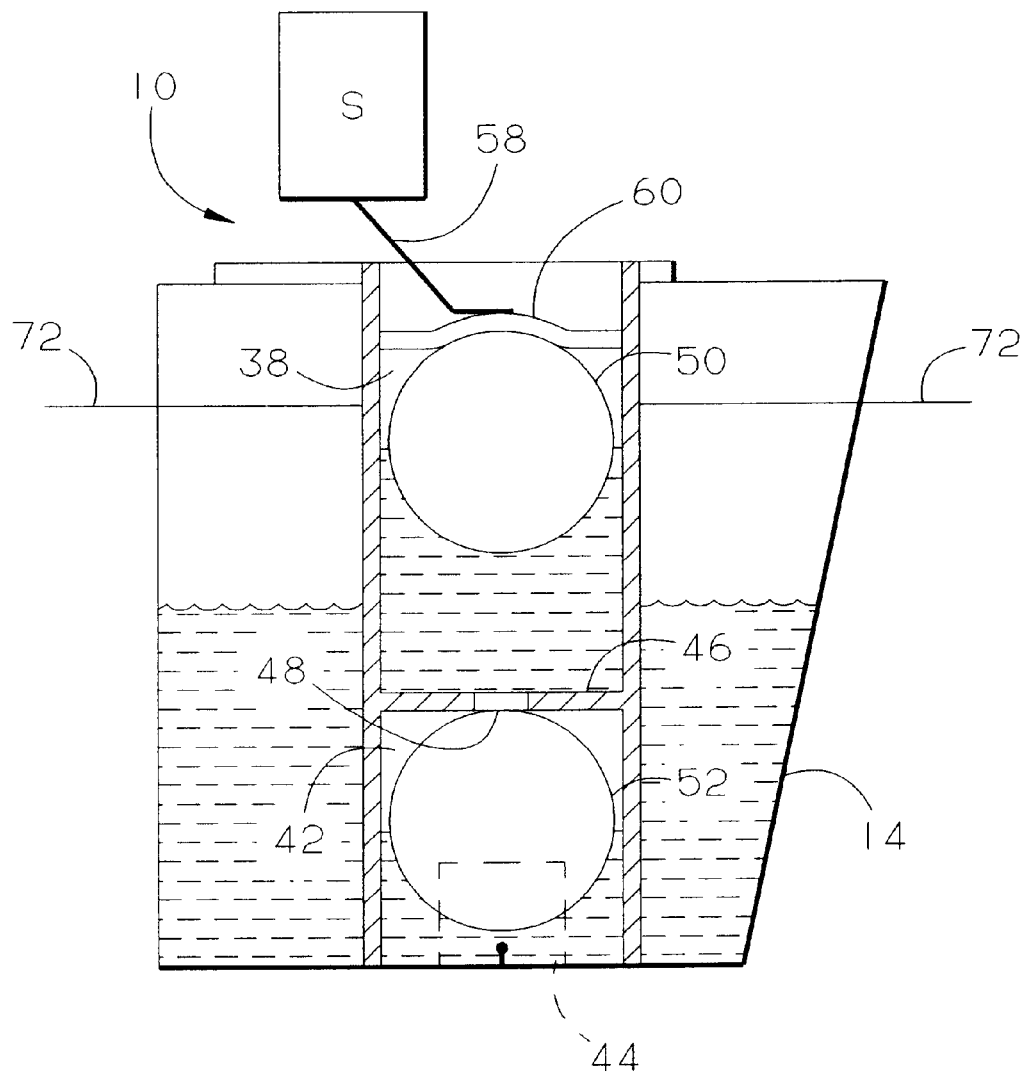

Referring to FIG. 6, once the first buoyant member 50 reaches the first predetermined level 72 as the first chamber 38 fills with fluid, the first buoyant member 50 acts upon the movable member 60. Because of its elastomeric nature, the movable member 60 responds to the first buoyant member 50 by actuating the blade 58 of the primary switch S. Once the primary switch S is actuated, an electrical connection is established with the pump 12 via wire 76 (FIG. 1). Thus, the pump 12 can begin removal of the fluid from the reservoir housing 14 through the outlet 30 to a remote location for either drainage or storage. One skilled in the art can appreciate that the pump 12 will continue to remove fluid from the reservoir housing 14 until contact with the primary switch S is broken through deactuation. As shown in FIG. 6, the fluid level in the reservoir housing 14 begins to recede as fluid is removed through the outlet 30 (FIG. 1). Despite the fluid level in the reservoir housing 14 receding, fluid within the first chamber 38 remains at the first predetermined level 72 causing the first buoyant member 50 to continue actuating the primary switch S, since the second buoyant member 52 continues to seal the orifice 48. Thus, the first and second chambers 38 and 42 remain filled with fluid, even while the fluid level in the reservoir housing 14 recedes.

Figure 7:
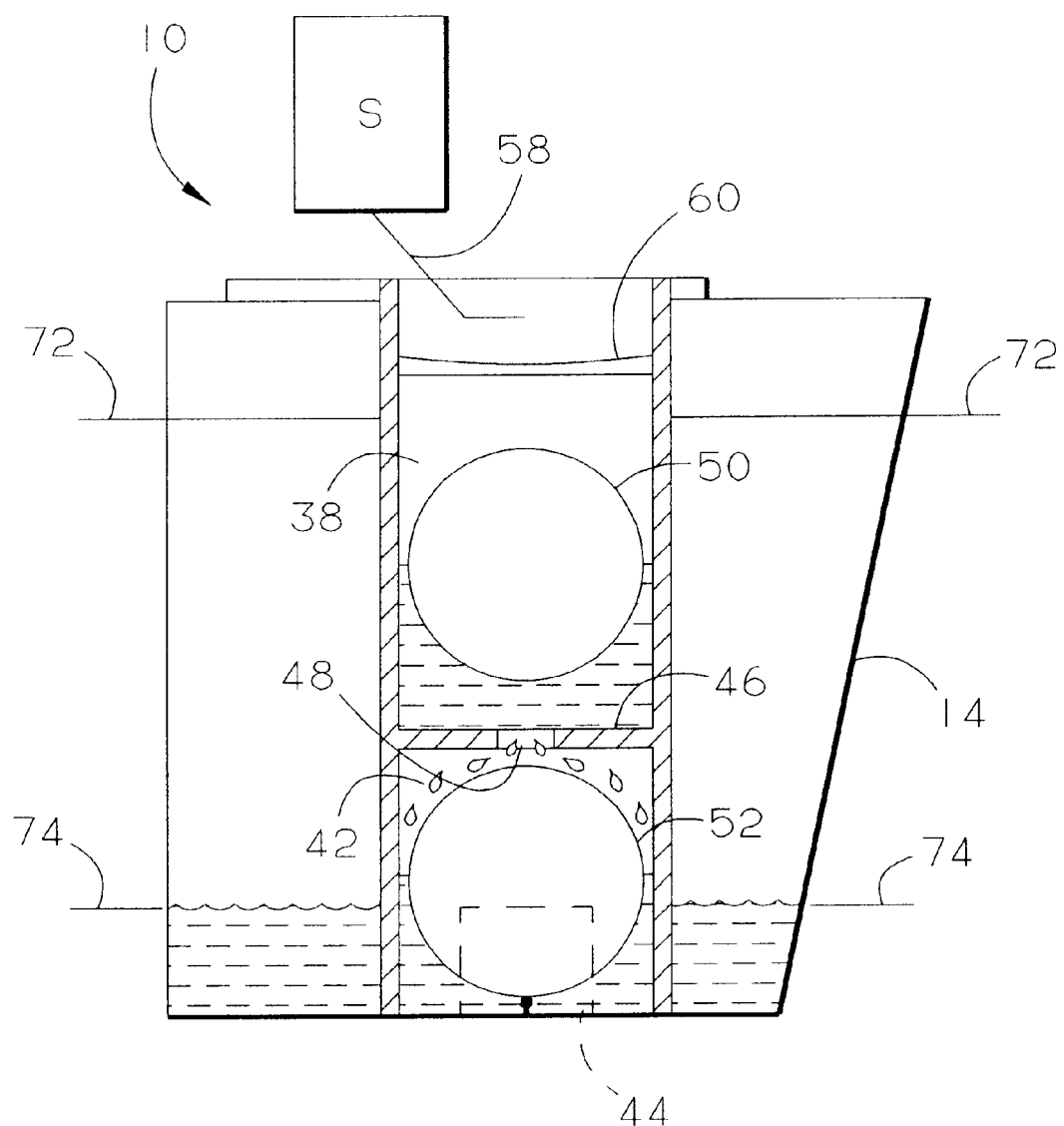

Referring to FIG. 7, the fluid level in the reservoir housing 14 continues to recede until it reaches a top edge of the aperture 44. This defines a second predetermined level of fluid, illustrated by line 74. Similar to the first predetermined level 72, the height at which the second predetermined level 74 occurs can be tailored in the design of the control apparatus 32 (FIG. 1) by sizing the aperture 44 of the second chamber 42 accordingly. As the fluid in the reservoir housing 14 recedes to the second predetermined level 74, the fluid in the second chamber 42 can begin to flow through the aperture 44 into the reservoir housing 14. When the fluid within the second chamber 42 begins to flow, the second buoyant member 52 releases itself and unseals the orifice 48. Once the second buoyant member 52 unseals the orifice 48, the fluid within the first chamber 38 can begin to recede as it flows through the orifice 48 and into the second chamber 42. Since the first buoyant member 50 moves in relation to the fluid level within the first chamber 38 which is receding, the first buoyant member 50 stops acting upon the movable member 60. Once the movable member 60 is released from the blade 58, the primary switch S is deactuated. This deactuation of the primary switch S breaks the electrical connection and turns the pump 12 off. Once the pump 12 is turned off and the fluid from the reservoir housing 14 is no longer exiting through the outlet 30, the first and second buoyant members 50 and 52 revert to their respective resting positions to begin the fluid removal cycle again. By virtue of the efficient design presented by this invention which utilizes the first and second predetermined fluid levels 72 and 74, to create a fluid level differential, a highly reliable fluid level management system 10 can be provided by which an efficient control apparatus 32 can actuate the primary switch S.

Numerous modifications in the alternative embodiments of the invention will be apparent to those skilled in the art in view of the foregoing description. For example, one can appreciate that a cycle of the fluid level management system 10 may be "completed" once the primary switch S is actuated. This can be advantageous when the primary switch S is electrically connected to trigger an alarm which alerts an operator that the reservoir housing 14 is full. Such may be desirable when the reservoir housing 14 requires manual fluid removal rather than automated fluid removal via a pump assembly (i.e., emptying of toxic chemical drums). Accordingly, this description is to be construed as illustrative only and is for the purpose of enabling those skilled in the art to make and use the invention and teaching the best mode of carrying out the invention. The exclusive rights of all modifications which come within the scope of the appended claims is reserved.

I claim:

1. A fluid level management system, comprising:
   a housing for receiving the fluid; and
   control means disposed within the housing for actuating a single activation switch responsive to the fluid within the housing reaching a first predetermined level, the control means adapted to hold the switch in an actuated position until the fluid within the housing recedes to a second predetermined level, the control means adapted to deactuate the switch upon the fluid within the housing receding to the second predetermined level, the control means including:
   a first float valve means in fluid communication with the housing for actuating the switch upon the fluid reaching the first predetermined level; and
   a second float valve means in fluid communication with the housing and cooperating with the first float valve means for preventing deactuation of the first float valve means prior to the fluid within the housing receding to the second predetermined level.

2. The fluid level management system of claim 1 wherein the first float valve means comprises:
   a first chamber having an aperture, the aperture defining the first predetermined level and providing fluid communication between the housing and the first chamber; and
   a first buoyant member movable within the first chamber as fluid within the first chamber rises to the first predetermined level for actuating the switch upon the fluid within the first chamber reaching the first predetermined level.

3. The fluid level management system of claim 2 wherein the second float valve means comprises:
   a second chamber having an aperture and an orifice, the aperture defining the second predetermined level and providing fluid communication between the housing and the second chamber, the orifice opening to the first chamber and adapted for providing fluid communication between the second chamber and the first chamber; and
   a second buoyant member movable within the second chamber as the housing receives fluid for sealing the orifice until the fluid within the housing recedes to the second predetermined level.

4. The fluid level management system of claim 3 wherein the second buoyant member is further provided for unsealing the orifice once the fluid within the housing recedes to the second predetermined level and allowing the fluid within the first chamber to recede from the first predetermined level and flow into the second chamber thereby causing the first buoyant member to deactuate the switch.

5. The fluid level management system of claim 4 wherein the first and second buoyant members are substantially spherical in shape and freely movable within the first and second chambers, respectively.

6. The fluid level management system of claim 5 further comprising:
   a movable member disposed between the first float valve means and the switch, and responsive to movement of the first buoyant member for actuating the switch as the fluid in the first chamber reaches the first predetermined level.

7. The fluid level management system of claim 2 wherein the first buoyant member is substantially spherical in shape and freely movable within the first chamber.

8. The fluid level management system of claim 1 wherein the second float valve means comprises:
- a second chamber having an aperture and an orifice, the aperture defining the second predetermined level and providing fluid communication between the housing and the second chamber, the orifice opening to the first float valve means and adapted for providing fluid communication between the second chamber and the first float valve means; and
- a second buoyant member movable within the second chamber as the housing receives fluid for sealing the orifice until the fluid within the housing recedes to the second predetermined level.

9. The fluid level management system of claim 8 wherein the second buoyant member is further provided for unsealing the orifice once the fluid within the housing recedes to the second predetermined level and allowing fluid within the first float valve means to recede from the first predetermined level and flow into the second chamber thereby causing the first float valve means to deactuate the switch.

10. The fluid level management system of claim 1 further comprising:
- a movable member responsive to the first float valve means for actuating the switch as fluid within the first float valve means reaches the first predetermined level.

11. A fluid management system for use with a reservoir pump, comprising:
- a housing for receiving fluid wherein a first fluid level in the housing varies between a predetermined low level and a predetermined high level; and
- control means disposed within the housing for actuating a single activation switch when the first fluid level reaches the predetermined high level, the control means including first and second valves in first and second chambers and being in fluid communication with the fluid in the housing such that a second fluid level is established in the control means which varies in a manner different than the variation of the first fluid level;
- wherein the control means holds the switch in an actuated position until the fluid within the housing recedes to a predetermined low level; and
- fluid removal means responsive to the control means actuating the switch for removing the fluid from the housing to a remote location.

12. The fluid level management system of claim 11 wherein the fluid removal means is further responsive to the control means deactuating the switch upon the fluid within the housing receding to the predetermined low level.

13. A fluid level management apparatus operational with a switch, comprising:
- a housing for receiving the fluid;
- control means disposed within the housing for actuating the switch responsive to the fluid within the housing reaching a first predetermined level and deactuating the switch upon the fluid within the housing receding to a second predetermined level, the control means including a first float valve means in fluid communication with the housing for actuating the switch upon the fluid reaching the first predetermined level, the control means further including a second float valve means in fluid communication with the housing and cooperating with the first float valve means for preventing deactuation of the first float valve means prior to the fluid within the housing receding to the second predetermined level; and
- fluid removal means responsive to the switch being actuated by the control means for removing the fluid from the housing.

14. The fluid level management apparatus of claim 13 wherein the first float valve means includes
- a first chamber having an aperture, the aperture defining the first predetermined level and providing fluid communication between the housing and the first chamber, and
- a first buoyant member freely movable within the first chamber as fluid within the first chamber rises to the first predetermined level for actuating the switch upon the fluid within the first chamber reaching the first predetermined level;

and wherein the second float valve means includes
- a second chamber having an aperture and an orifice, the aperture defining the second predetermined level and providing fluid communication between the housing and the second chamber, the orifice opening to the first chamber and adapted for providing fluid communication between the second chamber and the first chamber, and
- a second buoyant member freely movable within the second chamber as the housing receives fluid for sealing the orifice until the fluid removal means removes the fluid from the housing and the fluid recedes to the second predetermined level.

15. The fluid level management system of claim 14 further comprising:
- a movable member disposed between the first float valve means and the switch, and responsive to movement of the first buoyant member for actuating the switch as the fluid in the first chamber reaches the first predetermined level.

* * * * *